March 6, 1951     J. H. BOOTH     2,544,583
BALL JOINT
Filed Oct. 24, 1947
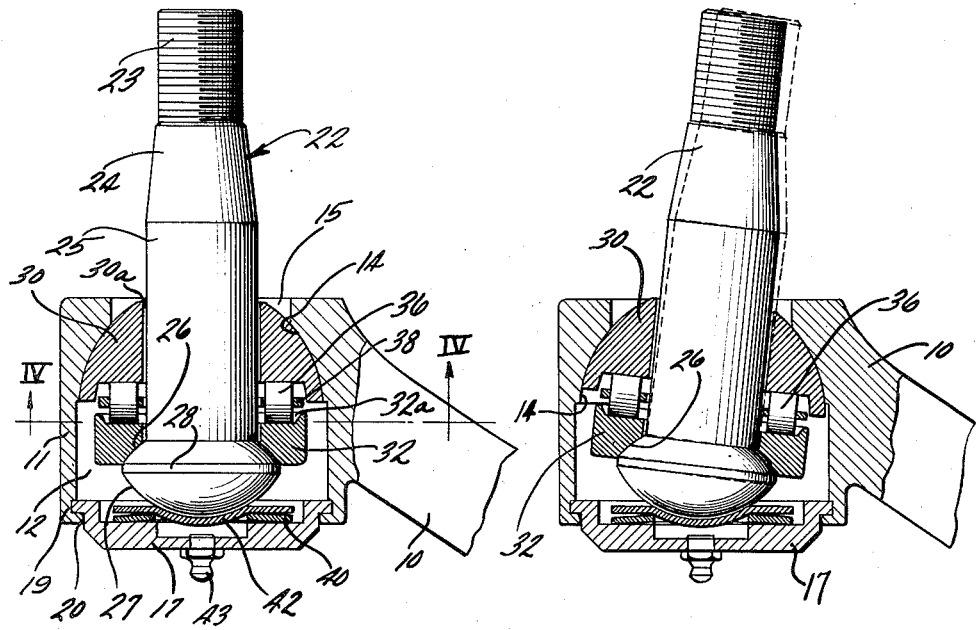
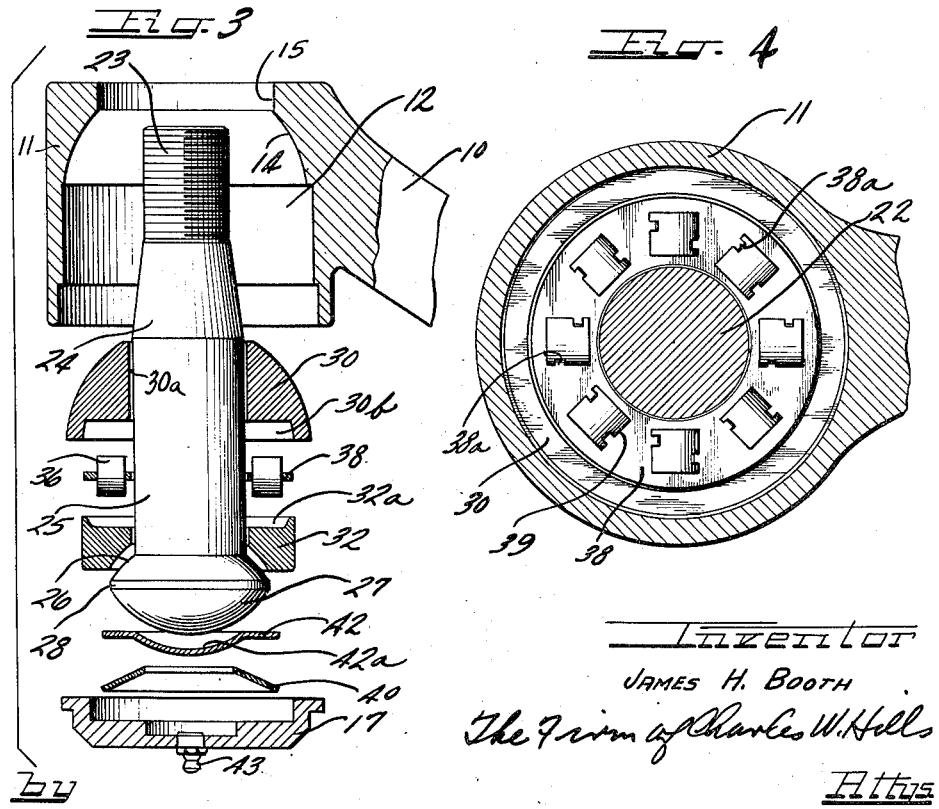
Inventor
JAMES H. BOOTH
The Firm of Charles W. Hills
by
Attys Patented Mar. 6, 1951

2,544,583

UNITED STATES PATENT OFFICE 2,544,583

BALL JOINT

James H. Booth, Corunna, Mich., assignor to Thompson Products, Inc., Cleveland, Ohio, a corporation of Ohio Application October 24, 1947, Serial No. 781,997

9 Claims. (Cl. 287—90)

1

This invention relates to joint structures having separate pairs of bearing surfaces for rotation and for tilting and more particularly relates to joints having stud heads disposed for rotation about their own axes on anti-friction bearings which are positioned in spherical elements pivotally mounted in housings.

The joints of this invention are especially adapted to function efficiently even when heavily loaded and are thus well suited for use in wheel suspensions for automotive vehicles.

For example, in joints connecting the wheel supporting mechanism with the wheel suspending mechanism of independently suspended wheel mountings for automotive vehicles, it is necessary to provide for tilting movement throughout a wide range. At the same time, however, free rotation of one of the joint elements about its own axis is necessary, irrespective of the angle of tilt of the member or load carried by the member.

While the ball joint of this invention is particularly adapted for use in an independent automotive wheel suspension, it may also be suitably adapted for use in other linkage connections such as tie-rods and drag links.

According to this invention, therefore, a stud, having a knob-like end portion comprising upper and lower segmental spherical surfaces, receives a thrust collar in self-aligning engagement on the upper spherical surface. The lower spherical surface of the stud is spring-pressed upwardly so that the thrust collar is urged into contact with a roller bearing assembly, which in turn is held against a seating member mounted in pivoting relation in the housing of the ball joint. Thus, the roller bearings, using the thrust collar and the seating member as lower and upper races respectively, permit free rotation of the stud and thrust collar. Pivoting of the stud is permitted by the pivoting engagement of the seating member in the housing.

A feature of this invention is the self-aligning engagement of the thrust portion on the spherical surface of the stud end which affords means whereby the stud can pivot without disturbing the alignment of the thrust washer in its capacity as a roller bearing race. Thus, excessive pivoting of the stud due to wear in the stud or in its associated parts, will not cause misalignment of the bearing races.

It is then an object of this invention to provide a ball joint wherein the ball stud has a separate thrust collar and is arranged to rotate with the collar on anti-friction bearings and to tilt on a pivotally mounted bearing.

Another object of this invention is to provide a ball joint wherein the ball stud carries a self-aligning thrust collar and is arranged to rotate on anti-friction bearings having a self-aligning race provided by the collar.

A further object of this invention is to provide a ball joint composed of parts capable of considerable relative tilting movement and of free relative rotary movement.

A still further object of this invention is to provide an improved arrangement of the various parts making up the joint whereby assembly thereof is greatly facilitated and the parts securely mounted.

A specific object of this invention is to provide a simple and efficient ball joint structure especially adapted for use in automobiles as a connection between certain coacting parts thereof such as tie-rods, drag links or in an independent front wheel suspension.

Another object of this invention is to provide a ball joint, having a stud connection extending therefrom, capable of carrying a considerable thrust load and still permitting free rotation of the stud.

Other and further objects and features of this invention will be apparent to those skilled in the art from the following detailed description of the annexed sheets of drawings which, by way of a preferred example, illustrate one embodiment of the invention.

On the drawings:

Figure 1 is a fragmentary vertical cross sectional view, with parts in elevation, of an assembled joint structure according to this invention;

Figure 2 is a vertical cross-sectional view of the assembled ball joint of Figure 1 with the stud pivoted therein, and particularly showing in dotted lines the coaction of the parts when some of them are in a worn condition;

Figure 3 is a vertical sectional exploded view of the component parts of the ball joint assembly of this invention; and Figure 4 is a horizontal sectional view taken on line IV—IV of Figure 1.

As shown on the drawings:

In Figures 1 to 3 the reference numeral 10 designates generally a control arm of an independently suspended wheel structure. The arm 10 has an inverted cup-shaped end portion 11 defining a cavity or chamber 12 provided near the top thereof with a segmental spherical bearing surface 14, terminating in an annular opening 15. The lower open end of the chamber 12 is closed by a plate 17 seated in a groove 19 formed within the housing wall. The plate 17 is held in position by peening or spinning the lower edges of the cup-shaped end portion 11 thereover, as indicated at 20.

A joint stud 22 projects through the opening 15, and has a threaded top portion 23, an intermediate tapered portion 24, a cylindrical portion 25 below the tapered portion, an upper segmental spherical bearing portion 26, a lower segmental spherical portion 27, and a relatively small cylindrical portion 28 between the bearing portions 26 and 27.

Tilting movement of the stud 22 relative to the cup-shaped end portion 11 is provided by a bearing ring or seat 30 which has a spherical outer surface cooperating with the spherical bearing surface 14 of the end portion 11. The stud 22 projects through a central aperture 30a of the bearing ring 30 and receives about its shank directly below said ring a substantially cylindrical thrust collar 32, having a lower socket portion with a spherical surface for cooperating with the upper segmental spherical surface 26 of the stud.

A recess 32a is provided in the upper surface of the thrust collar 32 to receive therein a plurality of roller bearings 36 held in radial spaced relation by a retainer ring 38. As shown in Figure 4, which is a sectional view looking upwardly, the rollers are loaded from the bottom in holes 39 in the retainer ring 38 and are held therein by tab portions 38a of the ring 38 bent over the bearing.

The upper top face of the thrust collar 32 has a recess 32a therein receiving the bottoms of the rollers 36 to act as the lower race of the roller bearing assembly. An upper race for the bearings 36 is provided by a recessed portion 30b in the lower end of the bearing seat 30 (Figure 3).

The various elements of the ball joints are held together in the chamber 12 by a spring washer 40 which is compressed between the closure plate 17 and a spring seat member 42 which has a socket portion 42a adapted to receive the spherical-shaped lower end of the stud 22.

In Figure 3 the spring washer 40 is shown in an unloaded condition, and in Figure 1 it is illustrated in its depressed loaded assembled form in the ball joint.

A grease fitting 43 is arranged in the closure plate 17 to afford means for greasing the joints.

From the foregoing description it is seen that there is provided in this invention a ball joint in which a stud is arranged to rotate freely on an anti-friction bearing assembly and to tilt relative to the housing of the joint on a spherical bearing seat mounted in the housing. Further, the anti-friction bearings will always rotate in a plane substantially perpendicular to the axis of the stud, this assuring easy rotation of the stud in a tilted position. The stud axis may vary or shift considerably due to wear, manufacturing tolerances and the like but such variations or shifting will never bind the bearings because the self aligning thrust collar always compensates for the misalignments.

In Figure 2 is illustrated in dotted lines a condition which may arise when either the walls of the central aperture of the bearing seat 30 or the sides of the studs 22 become worn. It is to be particularly noted that the thrust collar 32 will adjust itself on the upper bearing portion 26 of the stud 22 due to the spherical bearing surface contact made thereon. Thus, the thrust collar 32 may maintain its correct position as the lower bearing race of the bearing assembly even though wear in the other parts of the assembly occur.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A joint structure comprising a housing having a bearing wall therein accommodating tilting movement and a chamber below the bearing wall, a stud having a cylindrical shank and a knob-like end portion in said chamber, said end portion comprising opposed segmental spherical surfaces, a ring member disposed about said stud having a bearing surface of substantially the same contour as the adjacent segmental surface of said stud end portion and in bearing contact therewith, a bearing seat having a central aperture receiving said stud shank therethrough and having an outer wall in tiltable bearing contact with the bearing wall of the housing, an anti-friction bearing assembly disposed about said stud shank between said bearing seat and said ring member, a bearing plate having a pocket for receiving the adjacent segmental spherical surface of said stud, and a spring washer disposed between the housing and said bearing plate for urging said bearing plate and said stud upwardly against said ring member for holding said anti-friction bearing assembly in rolling contact with said ring member and said bearing seat and to urge said bearing seat into bearing contact with the housing.

2. A joint structure comprising a housing having a bearing wall therein accommodating tilting movement and a chamber below the bearing wall, a stud having an enlarged end portion in said chamber and a cylindrical shank with segmental spherical bearing surfaces on the end portion, a ring member disposed about said stud having a bearing surface of substantially the same contour as one of the segmental spherical bearing surfaces of said stud and disposed for tilting thereon, a tiltable bearing seat positioned around said stud having a bearing surface in contact with the bearing wall of the housing, an anti-friction bearing assembly disposed about said stud between said ring member and said tiltable bearing seat and a support member secured in said housing and abutting said stud to hold the bearing surfaces in engagement.

3. A joint structure comprising a housing having a bearing wall therein accommodating tilting movement and a chamber below the bearing wall, a stud having an enlarged end portion in the chamber and a cylindrical shank with segmental spherical bearing surfaces on the end portion, a ring member disposed about said stud having a bearing surface of substantially the same contour as one of the segmental spherical bearing surfaces of said stud and in contact therewith, a tiltable bearing seat positioned around said stud in contact with the bearing wall of the housing, an anti-friction bearing assembly disposed about said stud between said ring member and said tiltable bearing seat, and means for urging said stud against said ring member to hold said roller bearing assembly between said ring member and said bearing seat and to urge said bearing seat into proper bearing contact with the housing.

4. A joint structure comprising a housing having a segmental spherical bearing surface, a stud disposed in said housing and having a segmental spherical bearing portion, an anti-friction bearing assembly between said housing and said stud and having one race with a segmental spherical surface tiltable in said housing and the other race with a segmental spherical surface tiltable on said stud bearing portion and a support member anchored in said housing and abutting said stud to hold the bearing surfaces in engagement.

5. A joint structure comprising a housing having an inner segmental spherical bearing surface, a stud disposed in said housing and having a spherical bearing portion, an anti-friction bearing assembly having one race having a segmental spherical bearing surface disposed about said stud and tiltable in said inner bearing surface of said housing and the other race provided with a segmental spherical bearing surface tiltable on said stud bearing portion and a support member anchored in said housing and abutting said stud to hold the bearing surfaces in engagement.

6. A joint comprising a housing having an internal wall accommodating tilting movements, a seat ring tiltable on said wall, a stud having a shank fitting freely in said ring and a head with a spherical bearing surface in the housing beyond the ring, a race ring having a segmental spherical bearing surface tiltable on said head bearing surface, anti-friction elements between the seat ring and race ring, and a spring acting on the stud head for holding the parts in bearing relation.

7. A joint structure comprising a housing having an inner segmental spherical bearing surface, a stud disposed in said housing having a rounded bearing surface, an anti-friction bearing assembly having one race with an outer bearing surface of substantially the same contour as the inner spherical bearing surface of said housing and in tiltable contact therewith and having the other race provided with a rounded bearing surface tiltable on said stud bearing surface and a support member anchored in said housing and abutting said stud to hold the bearing surface in engagement.

8. A joint structure comprising a housing having an inner segmental spherical bearing surface, a stud disposed in said housing having a segmental spherical bearing surface near its lower end, an anti-friction bearing assembly with one race having an outer bearing surface of substantially the same contour as the inner bearing surface of said housing and in tiltable contact therewith, the other race having a bearing surface of substantially the same contour as that of the bearing surface of said stud and tiltably mounted thereon and a support member anchored in said housing and abutting said stud to hold said bearing surfaces in engagement.

9. A joint structure comprising a housing having an inner segmental spherical bearing surface, a stud disposed in said housing having a segmental spherical bearing surface near its lower end, an anti-friction bearing assembly with one race having an outer bearing surface of substantially the same contour as the inner bearing surface of said housing and in tiltable contact therewith, the other race having a bearing surface of substantially the same contour as that of the bearing surface of said stud and tiltably mounted thereon and a plurality of bearing elements between said races, and spring means between said housing and the lower end of said stud for urging said stud against said lower race to hold said anti-friction bearing elements between said races and to urge said upper bearing race into tiltable contact with said housing.

JAMES H. BOOTH.

No references cited.